United States Patent
Le Chevalier et al.

(10) Patent No.: US 9,495,559 B2
(45) Date of Patent: Nov. 15, 2016

(54) SHARING USER-GENERATED NOTES

(71) Applicant: Chegg, Inc., Santa Clara, CA (US)

(72) Inventors: Vincent Le Chevalier, San Jose, CA (US); Ohad Eder-Pressman, San Francisco, CA (US); Roded Konforty, Rehovot (IL); Charles Geiger, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 668 days.

(21) Appl. No.: 13/717,331

(22) Filed: Dec. 17, 2012

(65) Prior Publication Data

US 2014/0019562 A1 Jan. 16, 2014

Related U.S. Application Data (60) Provisional application No. 61/670,994, filed on Jul. 12, 2012.

(51) Int. Cl.

| | | |
|---|---|---|
| *G06F 15/16* | (2006.01) | |
| *G06F 21/70* | (2013.01) | |
| *G06F 21/10* | (2013.01) | |
| *G06Q 50/00* | (2012.01) | |
| *G06F 17/30* | (2006.01) | |
| *G06F 17/24* | (2006.01) | |
| *H04L 12/58* | (2006.01) | |
| *G06F 17/21* | (2006.01) | |
| *G06F 21/31* | (2013.01) | |
| *G06Q 50/20* | (2012.01) | |

(52) U.S. Cl.
CPC ............. *G06F 21/70* (2013.01); *G06F 17/212* (2013.01); *G06F 17/241* (2013.01); *G06F 17/30014* (2013.01); *G06F 17/30321* (2013.01); *G06F 17/30554* (2013.01); *G06F 21/10* (2013.01); *G06F 21/31* (2013.01); *G06Q 50/01* (2013.01); *H04L 51/08* (2013.01); *G06Q 50/20* (2013.01)

(58) Field of Classification Search
CPC .... G06Q 10/101; G06Q 50/01; G06Q 50/20; G06F 17/30873; G06F 21/70; G06F 21/10; G06F 21/31; G06F 17/241; G06F 17/30014; G06F 17/30321; G06F 17/30554
USPC ................................ 709/204, 205, 217, 219
See application file for complete search history.

(56) References Cited

U.S. PATENT DOCUMENTS

| | | |
|---|---|---|
| 6,279,014 B1 | 8/2001 | Schilit et al. |
| 6,457,026 B1 | 9/2002 | Graham |
| 6,584,480 B1 | 6/2003 | Ferrel |
| 7,945,852 B1 | 5/2011 | Pilskalns |
| 8,875,011 B2 | 10/2014 | Sitrick et al. |
| 2001/0042098 A1 | 11/2001 | Gupta et al. |
| 2002/0035573 A1 | 3/2002 | Black et al. |
| 2002/0054138 A1 | 5/2002 | Hennum |

(Continued)

*Primary Examiner* — Viet Vu
(74) *Attorney, Agent, or Firm* — Fenwick & West LLP (57) ABSTRACT

A method for sharing notes created in a multilayered document among users of a social network within a digital education platform is provided. In one embodiment, the digital education platform allows a user to create notes linked to a particular location in the document using a notepad application. Notes are aggregated and stored in the user's personal library on the digital education platform. When a user requests to share another user's notes and is granted access, the digital education platform retrieves the other user's notes and inserts the shared notes into the requesting user's existing notes associated with the document, based on their individual sharing attributes and metadata.

15 Claims, 5 Drawing Sheets

(56) References Cited

U.S. PATENT DOCUMENTS

| | | |
|---|---|---|
| 2002/0083096 A1 | 6/2002 | Hsu et al. |
| 2003/0076352 A1 | 4/2003 | Uhlig et al. |
| 2004/0255232 A1* | 12/2004 | Hammond ........ G06F 17/30873 715/207 |
| 2005/0010865 A1 | 1/2005 | Kuppusamy et al. |
| 2005/0251675 A1* | 11/2005 | Marcjan ............. G06F 21/6218 713/100 |
| 2006/0242558 A1* | 10/2006 | Racovolis ............. G06F 17/241 715/205 |
| 2006/0253449 A1 | 11/2006 | Williamson et al. |
| 2006/0277482 A1 | 12/2006 | Hoffman et al. |
| 2007/0130527 A1 | 6/2007 | Kim |
| 2007/0198534 A1 | 8/2007 | Hon et al. |
| 2007/0294614 A1 | 12/2007 | Jacquin et al. |
| 2008/0168073 A1 | 7/2008 | Siegel et al. |
| 2008/0222552 A1 | 9/2008 | Batarseh et al. |
| 2008/0235142 A1 | 9/2008 | Gonze et al. |
| 2008/0256113 A1 | 10/2008 | Rasmussen et al. |
| 2009/0070661 A1 | 3/2009 | van den Dungen et al. |
| 2009/0144277 A1 | 6/2009 | Trutner et al. |
| 2009/0235280 A1 | 9/2009 | Tannier et al. |
| 2009/0265607 A1 | 10/2009 | Raz et al. |
| 2009/0307762 A1 | 12/2009 | Cudd |
| 2009/0327855 A1 | 12/2009 | Le |
| 2010/0011282 A1 | 1/2010 | Dollard et al. |
| 2010/0131836 A1* | 5/2010 | Dukhon ................ G06F 17/241 715/230 |
| 2010/0299717 A1 | 11/2010 | Nasirifard et al. |
| 2011/0022449 A1 | 1/2011 | Bourne |
| 2011/0047485 A1* | 2/2011 | Takakura ............ G06F 21/6209 715/753 |
| 2011/0078251 A1 | 3/2011 | Cross et al. |
| 2011/0113320 A1 | 5/2011 | Neff et al. |
| 2011/0153744 A1* | 6/2011 | Brown ............. G06F 17/30731 709/204 |
| 2011/0239158 A1 | 9/2011 | Barraclough et al. |
| 2011/0264694 A1 | 10/2011 | Rensburg |
| 2012/0036423 A1 | 2/2012 | Haynes et al. |
| 2012/0110082 A1 | 5/2012 | Brown et al. |
| 2012/0159313 A1 | 6/2012 | Dejean |
| 2012/0221938 A1 | 8/2012 | Patterson et al. |
| 2012/0233154 A1 | 9/2012 | Walther et al. |
| 2012/0260283 A1 | 10/2012 | Purohit |
| 2013/0137078 A1 | 5/2013 | Shustorovich et al. |
| 2013/0139053 A1 | 5/2013 | Le Chevalier |
| 2013/0174016 A1 | 7/2013 | Glazer |
| 2014/0019438 A1 | 1/2014 | Le Chevalier et al. |

* cited by examiner

SHARING USER-GENERATED NOTES

CROSS-REFERENCE TO RELATED APPLICATION

This application claims the benefit of U.S. Provisional Application No. 61/670,994, filed Jul. 12, 2012, which is incorporated by reference in its entirety.

BACKGROUND

1. Field of the Invention

This invention relates to sharing notes associated with electronic documents among users of a digital publication platform.

2. Description of the Related Art

The rapid shift to mobile Internet services is bringing content offerings to an increasingly larger number of connected devices. Experiences previously limited to a single device are now accessible across multiple devices as high volume consumer electronic platforms such as Smart Phones, tablets, eReaders, game systems, and Internet TVs have become new channels to receive digital documents and services. Popular electronic book services leverage standardized publishing formats to seamlessly integrate and synchronize digital document reading experiences across consumer devices.

But while providing excellent user reading experience for this new digital medium remains a focus of the commercially available eReading systems and applications, it has been so far much more difficult to fully integrate other related reading activities, such as note taking and sharing. The simple action of writing a note into the border of a document remains a challenging proposition for a variety of reasons in most digital reading systems. In addition, as new digital content services are progressively embedded within the original document, it becomes increasingly difficult to create, edit, and organize these additional content layers into a single reading experience. As digital documents are shifting from a static model to a connected one where related, personalized and other social content are being aggregated dynamically within the original document, it becomes strategic for publishing platforms and their distribution systems to be able to properly author and manage these new individual content layers among a plurality of users.

SUMMARY

Embodiments of the present invention provide a method, a storage medium and a system for sharing notes created in a multilayered document among users of a social network within a digital education platform. Individual notes created by a user within a notepad application are aggregated into note's specific documents and added to the user's personal library on the digital education platform. Each notes document is made of a list of distinct note windows with corresponding metadata which are linked to their referenced locations within the multilayered document. When a user requests to share another user's notes and is granted access, the digital education platform inserts and interleaves the shared notes into the requesting user's existing notes associated with the corresponding document pages based on the metadata.

In one embodiment, the digital education platform allows importing of shared notes from emails. A user may receive an email at an email address registered at the platform. The email includes email content and an email header containing information about an identifier of a document and a location within the document. The platform extracts the email content from the received email, and generates one or more note windows from the extracted email content. The one or more note windows are then interleaved with the user's existing notes associated with the document, each note maintaining their referenced location within the document based on information extracted from the email header and metadata.

The features and advantages described in this specification are not all-inclusive and, in particular, many additional features and advantages will be apparent to one of ordinary skill in the art in view of the drawings, specification, and claims.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Overview

Embodiments of the present invention provide a system and method for sharing notes associated with a multilayered digital document. The system is built upon an educational digital publishing and reading platform (hereinafter referred to as "the digital education platform" or "the platform") configured to aggregate, manage, and distribute multilayered content. The digital education platform also manages an educational social network that provides learning and reading services to the participating users, such as teachers, students and authors. The content in modern markup language format can be downloaded to general eReading applications (e.g., a HTML5 compatible browser) on a page by page basis and can be easily extended to support a multilayered structure so as to incorporate supplemental content in additional layers. Users of the digital education platform can access multilayered documents via any popular web browser applications. Users may also join the social network to interact with each other and share user-generated content within their learning and reading education services.

Figure 1:
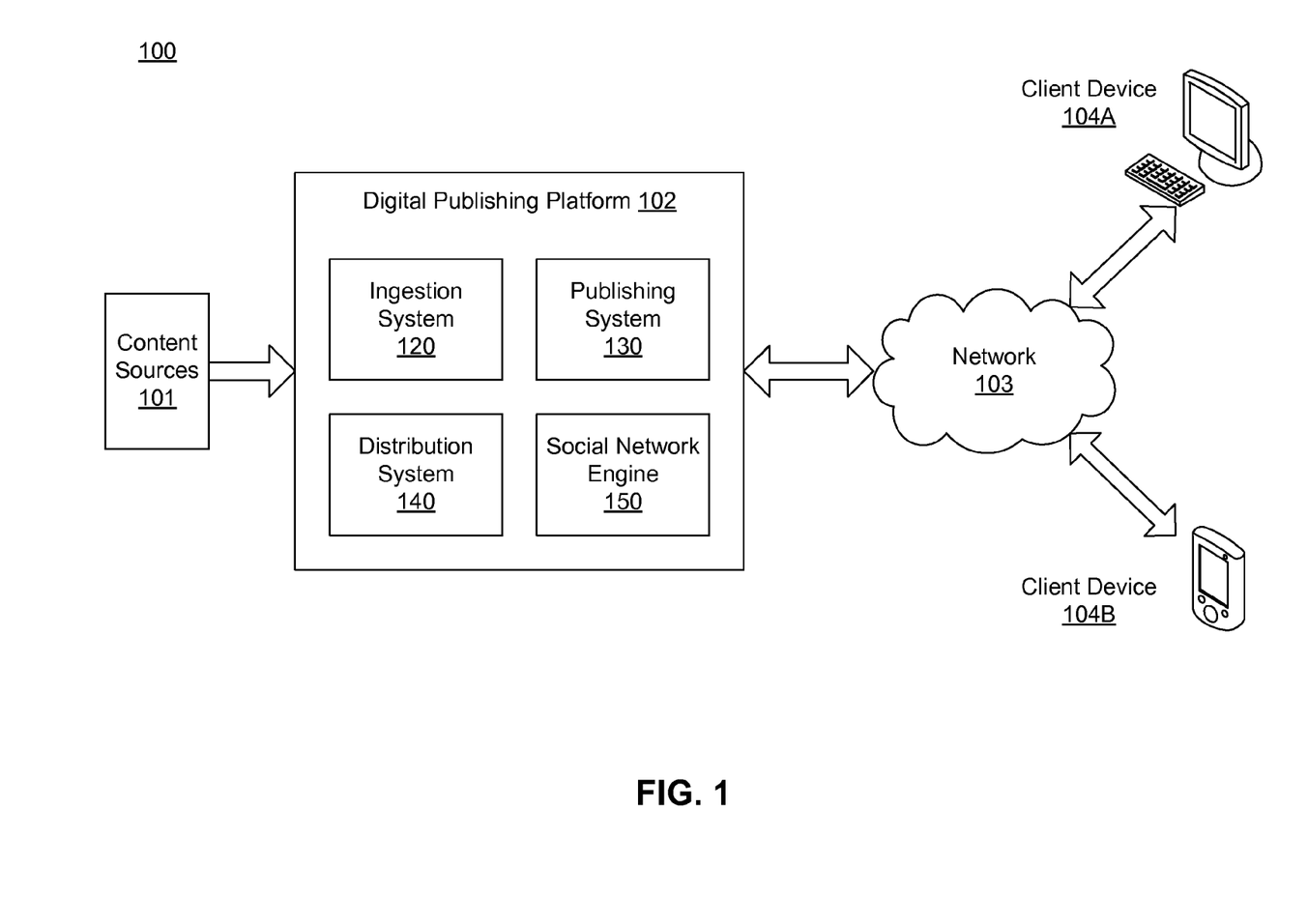
FIG. 1 is a high-level block diagram illustrating a system environment for an educational digital content publication and reading platform according to one embodiment.

FIG. 1 is a high-level block diagram illustrating an environment 100 for the digital education platform, which comprises content sources 101, a digital education platform 102, a network 103, and one or more client devices 104. The network 103 is typically a content delivery network (CDN) built on the Internet, but may include any network, including but not limited to a LAN, a MAN, a WAN, a mobile wired or wireless network, a private network, or a virtual private network. The client devices 104 access the content from eReading browser applications running on computing devices connected to the network 103. The client devices 104 include a personal computer, such as a desktop, laptop, or tablet computer, a personal digital assistant, a mobile or smart phone, or a television "set-top box" using a client web application.

The content sources 101 include digital and printed content automatically gathered and aggregated from a large number of publishers, categories, and partners. Examples of content include textbooks, trade books, magazines, newspapers, user-generated content, web content, and advertising content. Content is automatically collected from various content sources 101 into a formalized staging environment.

The digital education platform 102 aggregates, validates, transforms, packages, and monetizes the content collected by the content source 101 into a number of services, prior to distribution to the client devices 104 over the network 103. The platform comprises four modules: ingestion system 120, publishing system 130, distribution system 140, and social network engine 150. Other embodiments may include more or fewer and/or different modules.

The ingestion system 120, including staging, validation, and normalization subsystems, ingests published documents that may be in a variety of different formats, such as PDF, ePUB2, ePUB3, SVG, XML, or HTML. The ingested document may be a book, such as a textbook, a set of self-published notes, or any other published document, and may be subdivided in any manner. For example, the document may have a plurality of pages organized into chapters, which could be further divided into one or more sub-chapters. Each page may have text, images, tables, graphs, or other items distributed across the page.

After ingestion, the documents are passed to the publishing system 130. If the document ingested by the ingestion module 120 is not in a markup language format, the publishing system 130 automatically identifies, extracts, and indexes all the key elements and composition of the document to reconstruct it into a modern, flexible, and interactive markup language document, for example, an HTML5 web page well-suited for distribution across various computing devices. The transformed content preserves the original page structure including pagination, number of columns and arrangement of paragraphs, placement and appearance of graphics, titles and captions, and fonts used, regardless of the original format of the source content and complexity of the layout of the original document. In one embodiment, the publishing system 130 reconstructs published documents so as to accommodate dynamic add-ons, such as related content, while maintaining page fidelity to the original document.

During reconstruction, the page structure information can be assembled into a document-specific table of contents describing locations of chapter headings and sub-chapter headings within the document, as well as locations of content within each heading. The document's table of contents indexes the content of the document into a description of the overall structure of the document, including chapter headings and sub-chapter headings. Within each heading, the table of contents identifies the structure of each page. As content is added dynamically to the reconstructed document, the content is indexed and added to the table of contents to maintain a current representation of the document's structure.

After reconstructing a document, the distribution system 140 packages content of the publishing platform 102 for delivery, uploads the content to content distribution networks, and makes the content available to end-users based on the content's digital rights management policies. In one embodiment, the distribution system 140 includes a content protection subsystem, which is interfaced between the distribution system 140 and the eReading browser applications running on the client devices 104, essentially integrating the digital content management (DCM), content delivery network (CDN), delivery modules and eReading data collection interface for capturing and serving all users' content requests. By having content served dynamically and mostly on-demand, the system effectively authorizes the download of one page of content at a time through time sensitive dedicated URLs which only stay valid for a limited time, for example, a few minutes, all under control of the platform service provider.

The distribution system 140 may also aggregate additional content layers from numerous sources. These layers, including related content, user-generated content, advertising content, and social content, may be added to the document to create a dynamic, multilayered document. For example, related content may comprise material supplementing the core document, such as study guides, self-testing material, solutions manuals, glossaries, or journal articles. User-generated content includes annotations made by a user during an eReading session, such as highlighting or taking notes. In one embodiment, user-generated content may be self-published by a user and made available to other users as a related content layer. Advertising content may be uploaded by advertisers or advertising agencies to the publishing platform, such that advertising content may be displayed with the document. Social content may be uploaded to the digital education platform by the user or by other users (e.g., classmates, teachers, authors, etc.) from the user's social connections. Examples of social content include interactions between users related to the document and content shared by friends in the user's social networks.

The social network engine 150 creates and manages an educational social network among users of the education digital education platform. For each individual user, the social network engine 150 automatically discovers and recommends social connections to the user based on user profile and other information about the user. For example, the social networking engine 150 may identify potential social connections for a student user, such as other students registered for the same or similar classes, instructors of the classes for which the student registered, and authors of the textbooks that the student reads from the student's school and other schools. These identified social connections are then recommended to the student, who may connect to them by accepting and joining the educational social network managed by the social network engine 150.

eReading Environment

Figure 2:
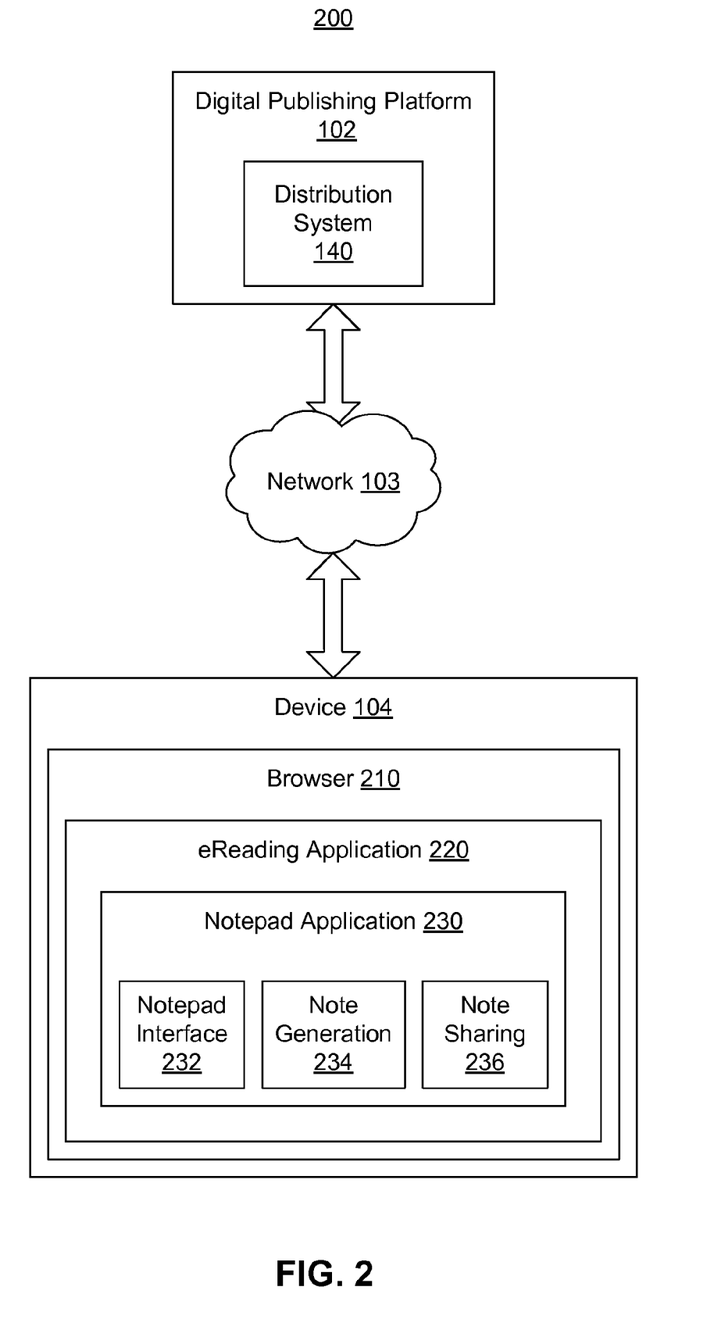
FIG. 2 is a block diagram illustrating an eReading environment including the digital education platform and a client device connected by a network according to one embodiment.

FIG. 2 is a block diagram illustrating an eReading environment including the digital education platform 102 and the client device 104 connected by the network 103 according to one embodiment. Although only one device 104 is illustrated in FIG. 2, any number of user devices may communicate with the platform 102 to access content distributed by platform 102. In one embodiment, a user is associated with an account on the digital education platform 102, and content purchased by the user is made available through the user account. The user device 104 and account of the user are authenticated by the digital education platform 102 when the user requests content access during online sessions for reading and learning. Furthermore, a user may interact with multilayered content from multiple devices including a desktop computer, a laptop, a smart phone, a tablet, an eReader, an Internet television, or any other device including computing functionality and data communication capabilities, and use one or more of these devices simultaneously through authenticated online reading and learning sessions.

Each device 104 executes a web browser 210 and at least one eReading application 220, which communicates with the content distribution system 140 to access multilayered content through the network 103. Contrary to other existing digital publishing services, the digital education platform 120 allows the user to access content without downloading a specific reading application from the publisher. Rather, the eReading application 220, comprising client software compatible with the web browser 210, reconstructs document pages using structureless HTML5 elements. The eReading application 220 fetches content from the distribution system 140 in small increments, such as one page at a time. Alternatively, the user device 104 may cache one or more pages of the document to enable faster retrieval of the pages. The eReading application 220 integrates a number of a user's reading activities, including reading the content, navigating between pages, creating highlights, interacting with advertisements, generating social content, and taking notes, among any other user activities. User-generated content can be stored and archived into the online user account so that it may be synchronized across and accessed from any registered devices of the user.

In one embodiment, a notepad application 230 enables a user to annotate a document distributed by the digital education platform 102. The notepad application 230 includes a notepad interface module 232, a note generation module 234, and a note sharing module 236. Other embodiments may include more or fewer and/or different modules. The notepad application 230 may be configured as a plug-in compatible with the web browser 210, or integrated with the eReading application 220 in a single application. For example, the notepad application 230 can be framed as a secondary application within the eReading browser application 220.

User notes created from the notepad application 230 are fundamentally linked to the particular multilayered document that is being accessed at the time of the notes' creation. For instance, all the user's notes to be created following the launch of a notepad user interface are referenced from within the structure of the opened multilayered document, including specific information about the table of contents from that document. By referencing the table of contents of the opened document, the notes can be mapped to page locations within the original document and thus become supplemental material to the existing publication.

Adding Notes

Figure 3:
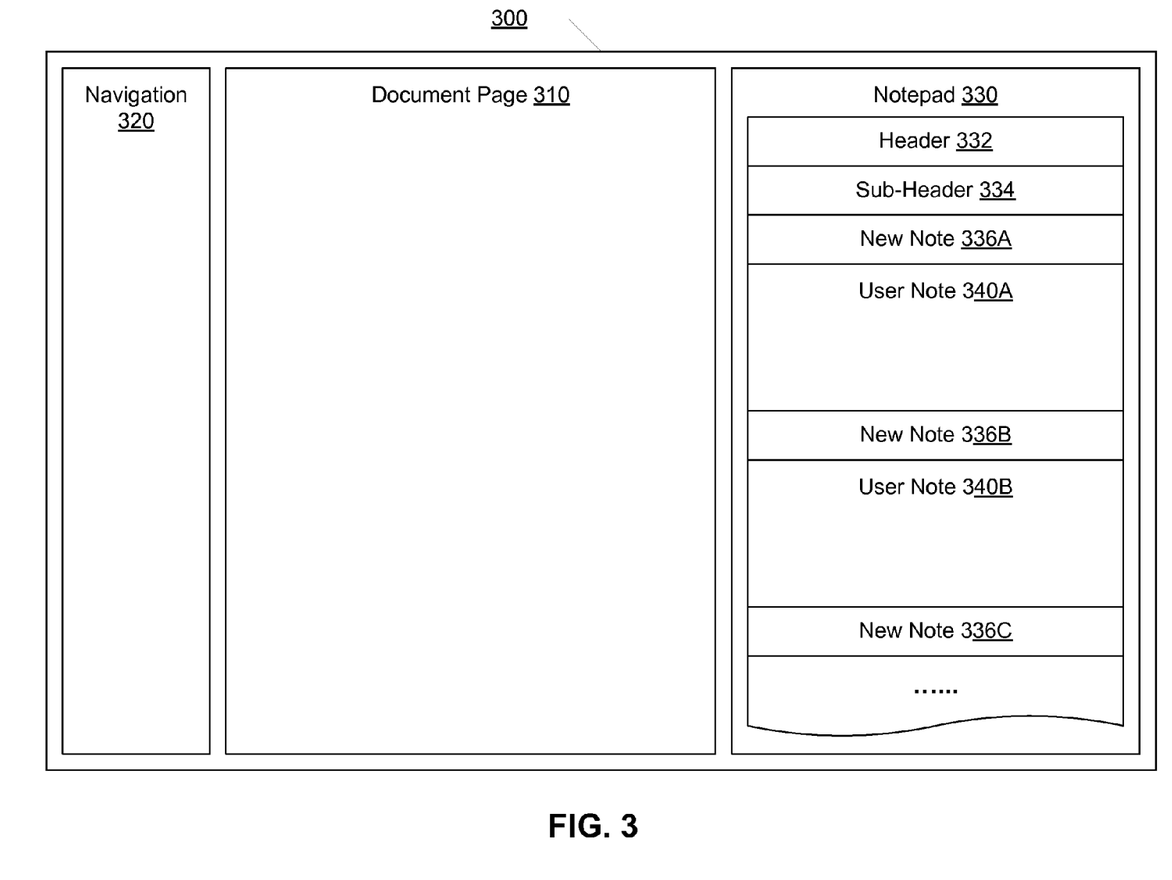
FIG. 3 is a block diagram illustrating an example user interface of the notepad application displayed in a browser according to one embodiment.

As a user reads and interacts with a multilayered document, the user may create, view, and organize notes within the notepad by interacting with a notepad application 230 executing on the user's device 104. In one embodiment, each user's eReading application is associated to a notepad application for the creation and organization of user-generated notes. The notepad user interface comprises a plurality of note windows for storing user-generated notes. FIG. 3 is a block diagram illustrating such an example user interface 300 of the notepad application 230 displayed in the browser 210 according to one embodiment. The user interface 300 includes a document page window 310, a navigation pane 320, and a notepad panel 330.

While the user reads the multilayered document, each page of the document is reconstructed by the eReading application 220, rendered by the browser 210 and displayed in the document page window 310. The navigation pane 320 lists the table of contents of the document or a high-level summary of the table of contents, enabling the user to view an outline of the document structure. In one embodiment, a user may navigate through the document by clicking on links or icons within the navigation pane 320. For example, when the user clicks on a link titled "Chapter 9," the eReading application 220 will fetch the page having the start of chapter 9 from the digital education platform 102. Alternatively, one or more pages may be cached within the browser's memory on the device 104, in which case the eReading application 220 may retrieve a page from the browser's memory cache instead. Browser 210 can then render and display the fetched (or retrieved) page within the document page window 310.

The notepad panel 330 is generated by the notepad interface module 232 within the browser 210 for the user to create and view notes. The notepad panel 330 may be launched by a user during an eReading session, which opens the notepad panel 330 in the same HTML5 browser as the already-opened eReading browser application 220. In one embodiment, the notepad panel 330 is rendered alongside the document page 310 in the same browser tab, as illustrated in FIG. 3. The notepad application 230 may also integrate a wide screen mode that occupies the document page window 310 and navigation pane 320, for example, when a user clicks an "expand window" button or drags the notepad panel 330 to the left. In another embodiment, a user may effectively separate the notepad panel 330 from the document page window 310 by opening the notepad on a different paired device.

The notepad panel 330 may contain multiple fields, for example, a header 332 lists the title of the opened multilayered document to which the entire user notes refer. The header information can be automatically extracted from the eReading application 220, which processes the table of contents of the multilayered document. For example, a user "Joe" reading a "Biology101" textbook from the eReading application 220 generates, upon launching of the notepad application 230, notes with the header "Biology101+Joe," which is stored at the digital education platform 102. The sub-header 334 lists the generic location within the document that is opened while the user creates or edits a note. In one embodiment, the sub-header 334 can be defined with table of contents level information extracted from the document, such as chapter or subchapter. For example, user "Joe" adding a first note to "Chapter 1" of "Biology101" may create a new sub-header "Biology101+Chapter1" in the notepad panel 330. As another example, user "Joe" adding a second note to "Chapter1" of "Biology101" may append the second note under the existing sub-header "Biology101+Chapter1" of the notepad document "Biology101+Joe."

The notepad panel 330 may include one or more note windows, such as new notes 336 and user notes 340. A note window is a dynamically resizable box within the notepad panel 330 for either editing or displaying notes. The user notes 340 are notes already existing in the notepad beneath the sub-header 334. The new note windows 336 are empty boxes in which the user may create new notes. When selected, a note window switches from passive (display) to active (editing) mode, which enables the creation or importation of content into it.

Referring back to FIG. 2, the notes generation module 234 receives user inputs from the notepad panel to generate notes. The user input may be received at the note windows 336 displayed in the notepad panel 330. For example, the user may click on a note window, such as note window 336A, or move a cursor over to the note window. The user may then input content into the note by typing within the note window. Alternatively, the note generation module 234 may receive a user input at other locations than the note windows. For example, the user may select a section of content, such as highlights, in the document page window 310 to import into a note. The note generation module 234 may automatically create a link between the note and the section of the document, and add the selected content to the next available note window beneath the sub-header indicating the location of the selected content. The selected content may be imported as text-only or as a graphic object to a note window.

The note generation module 234 may import notes from external sources, such as an online dictionary or encyclopedia. The user can add links to web pages and multimedia content, such as images, audio and/or video files into note windows, in which case the note generation module 234 may analyze the web page or the multimedia content to create custom thumbnails to attach to the note. This approach allows web page or the multimedia content to be accessed or launched from within the notepad window. The note generation module 234 can automatically import content, such as text, images, multimedia files, and links, from emails received at email accounts registered to the user. The email is processed to extract email header and/or indexing keywords to match the email to one or more documents the user is authorized to access. The embedded content of the email can then be extracted and inserted to notes associated with the matched documents.

The note generation module 234 of the notepad application 230 associates each note window with a set of metadata unique to the particular user's activities that led to the creation of that note, which is identified by a descriptor. For instance, a note window's metadata typically includes information such as the type and nature of its embedded content, source and origin of its embedded content, the imported location designation within the original document, the location referential within the notepad panel 330, the time of creation, and a log to keep track of various edits over time. The metadata may also include information about the user who created the note, providing the user with explicit rights or ownership of the note. During the course of note taking activities, notes are progressively added to the user's notepad document in an expanding list of windows stacked on top of each other linked within the section of the document to which these notes belong. The aggregation, organization, and management of these windows by the notepad application 230 translate into an HTML5 notes document that is unique to the particular user and the multilayered content document.

When the user has completed the note, the notepad application 230 enables the particular note to be indexed, synchronized and referenced by the specific page of the multilayered document from which the note originated, and added to a notes document structure inherited from the table of content of the document. If available, the note window may also inherit metadata describing digital rights management information of the source content. In one embodiment, a user completing a note causes the notepad interface 232 to automatically open a new and empty note window in passive mode just before and after the completed note, such as new windows 336B and 336C displayed before and after user note 340B.

Each note window, as displayed in the notepad panel 330, is tied to a notes document structure that can be interacted with independently from the linked multilayered document in the user's notepad. Because each note window maintains its respective link to the overall structure of the referenced document regardless of the actual location within the notes document structure, the notes can be consulted separately from the document pages reconstructed by the eReading application. This partial decoupling between notes and document pages synchronization provides the user with a mechanism to consult existing notes within the entire multilayered document without necessarily downloading the specific document pages that are referenced by these individual notes.

Sharing Notes

Users of the digital education platform not only interact with the multilayered content from a variety of content sources, but can also interact with each other. For example, users may be interested in communicating with each other if they share common teachers, assignments, or exams. Additionally, teachers, teaching assistants and academic authors may be interested in communicating with each other and with students across different schools for feedbacks on their teachings and textbooks materials. This particular form of interactions helps organize the users of the digital education platform into a special kind of social network, which extends the traditional classrooms into the cyber space. Users may be connected to potentially unlimited number of other users in a cloud of virtual classrooms, thus forming an educational social network for learning purposes.

Embodiment of the note editing system enable users to create, manage, publish and share their personalized notes with other users of the digital education platform. Generally speaking, users of such a platform can be segmented into distinct groups by roles, including for example, students, teachers, and authors. Although the process of creating and managing notes is the same for any user, there are a number of variations regarding the self-publishing and sharing of personalized notes that may depend on the role of the user.

A teacher can create a master notes through the notepad application and add the master notes as a user-generated layer to a multilayered digital textbook. As the creator of the master notes, the teacher determines which users among the teacher's social connections may access the master notes and access rights associated with those users for the published content layer. By authorizing sharing, the teacher instructs the digital education platform to aggregate and add the master notes document into the platform content catalog, effectively making the master notes available for publishing and distribution. When other users, for example, students from the teacher's class, request to access the shared master notes, the access rights of the requesting users are checked by the digital education platform. The master notes are accessible only to users authorized by the teacher and access rights are enforced by the digital education platform authentication system. For instance, the teacher may decide to share the master notes with all the students attending the teacher's class. As a result, students attending the teacher's class are granted access to the shared master notes within the notepad application, where the master notes can be displayed alongside the corresponding textbook pages.

While sharing the master notes, the teacher may edit and update the master notes as many times as necessary. Whenever the master notes are updated, the digital education platform updates the notes document from the platform content catalog and makes the new notes available for immediate distribution. Following refresh activities, the notepad applications on the client devices automatically get notified and may start fetching the updated notes from the platform. Furthermore, the teacher can also customize the master notes or make specific versions of the notes targeting specific users or user groups within the teacher's social network, such as one or more students in a particular class.

Similarly, the notepad application provides authors and writers a solution for updating and personalizing their published work through convenient and efficient distribution of supplemental authors' notes. In addition, other experts on the same subject matter can contribute by creating and sharing their notes associated with the published digital document. This offers a channel for authors and other subject matter experts to connect with users, most notably teachers and students in the education domain.

Although a student's notes are usually written for the student's own benefit, the notepad application enables students to publish, and share their personalized notes created in connection to multilayered content documents. Such note sharing may be beneficial to students in support of active learning and collaboration activities, such as assignments, study groups and group projects.

In one embodiment, user-generated notes are uploaded to the digital education platform and made available for downloading by other users based on sharing rules associated with the notes. Note sharing rules are typically defined by multiple parameters, such as which notes to be shared and who to be granted access rights. For example, a user may set sharing rule for his notes associated with a textbook by segmenting his social connections into two distinct groups: the first group is granted access to all the notes within that user's notes document, while the second group is not allowed any access. Within the first group, sharing rules further segment users into groups with different access rights: for instance, a first group that can access all the notes associated with the textbook, a second group who has access to notes that are only linked to a chapter or section of the textbook, and a third group who may access just a single note in the user's shared notes document.

Sharing rules set by notes creators may further include terms and conditions for the notes to be shared. As a result of these sharing rules for user notes, various sharing models can be defined and supported by the notepad application in the digital education platform. For example, a public access model allows a user's notes to be available to all users, while in a restricted access model, access rights are granted to selected members of the sharing user's social connections in the educational social network. Regardless of public or restricted models, a sharing can be time-limited, i.e., notes are available only for a predetermined period of time. Furthermore, access rights can include permissions to read and/or write (edit) the shared notes. A notes creator may also list notes for peer review, or mark a note as "I have a question" and seeking answers from other users. Sharing rules can be assigned and updated dynamically by the note creators based on time, schedule, social connections and any changes in those conditions.

As described above, notes created by a user inside the notepad application are aggregated and stored in note windows in the user's personal library on the digital education platform. Each note window is associated with a particular location in the document (e.g., pp. 100, line 12), which is included in a set of metadata identifying the respective note window. The set of metadata also contains information such as type and origin of the embedded content, note position in the notepad panel, time of creation, and editing history. When a user B requests access to user A notes for a particular document and is granted access by user A, the digital education platform inserts the shared notes of user A into existing notes associated with the document of the requesting user B by interleaving each of user A's individual notes into user B's existing note's document structure while keeping all the notes original links to the multilayered document. This process is done from the platform back-end servers on the requesting user's notes document and personal library, resulting in an updated version of that user note's document that replaces the previous version. Following the release of this updated version, the user's notepad application gets the updated notes, including the newly added interleaved notes, by either refreshing or fetching new content from the platform distribution servers. For example, each time a new user session starts, notes linked to the displayed document pages can be fetched by the notepad application and rendered alongside the document pages.

Figure 4:
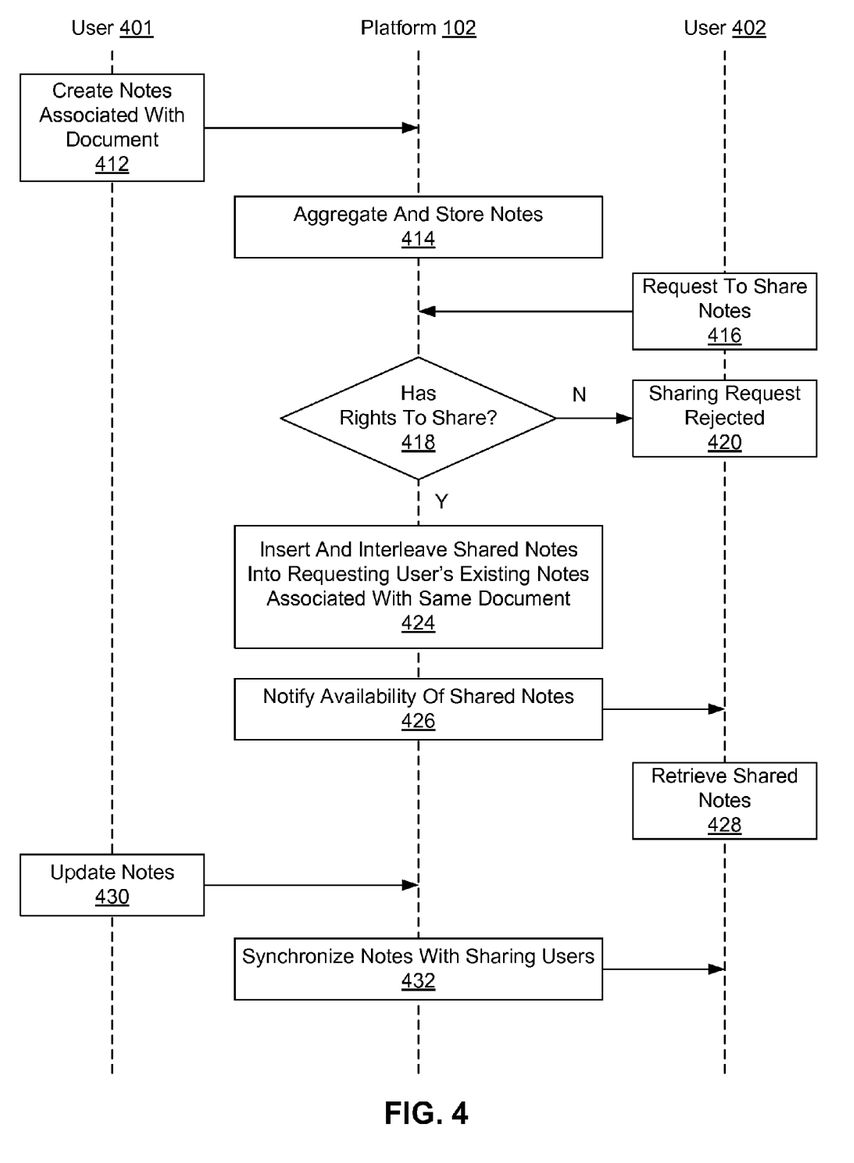
FIG. 4 is a flowchart illustrating a method for sharing shared notes associated with a document according to one embodiment.

FIG. 4 is a flowchart illustrating a method for sharing notes according to one embodiment. The sharing process involves three parties: the note creator—user 401, the digital education platform 102, and a second user 402 who requests to share notes created by user 401. The first user 401 of the digital education platform logs in to the digital education platform from the eReading browser application on his/her reader devices, and creates notes in note windows using the notepad application associated with a multilayered digital document in step 412. Each note in a note window is linked to a location within the multilayered document. For example, the user 401 may be reading a multilayered textbook using the eReading browser application, which displays one or more pages in the document page window 310, with reference to FIG. 3. The user 401 is also taking notes in the notepad panel 330 while reading the same document. The user 401 may click on a note window, such as note window 336A, to create a new note linked to a location within the current document page by typing in the note window or pasting content from other sources. Once created by the user 401, the note is automatically uploaded to the digital education platform, which aggregates it with the user's existing notes associated with the document and stores the notes in the user's personal library managed on a per account basis by the digital education platform in step 414. The user 401 may keep the notes for reference, publish the notes online, and/or sharing the notes with other users. The digital education platform 102 may also synchronize the notes across all the client devices of the user 401 any time, for example, at the end of the eReading session when the user 401 logs out, at the beginning of each eReading session when the user 401 logs on to the platform, or periodically during an eReading session when the user 401 is online and accessing that particular document.

Next, a request from the second user 402 to share the notes created by the first user 401 is received by the digital education platform in step 416. In one embodiment, the request to share the note is an explicit request from the second user 402. Alternatively, the request can be implicitly triggered, for example, when the second user 402 connects to the first user in the educational social network. In response to the request, the digital education platform determines, in step 418, whether the second user 402 has access rights for the notes created by the first user 401, for example, by an authentication system of the digital education platform. The digital education platform may make a decision based on the access rights designated by the first user 401. Optionally, the digital education platform may confirm with the first user 401 on the access right associated with the notes created and uploaded by the user 401.

If determined that the user 402 does not have the right to access the shared notes created by user 401, the digital education platform 102 rejects the sharing request so that user 402 receives a rejection in step 420. Otherwise if the user 402 has the access rights to the shared notes, as specified by the user 401 when setting sharing attributes of the notes, the platform 102 inserts and interleaves the shared notes into the requesting user's existing notes (the user 402 in this example) associated with the same multilayered document in step 424. In one embodiment, a reference or a pointer of the shared notes are inserted into the requesting user's existing notes instead of inserting a copy the shared notes. Next in step 426, the platform 102 notifies the availability of the shared notes to the requesting user 402, so that user 402 can retrieve the shared notes in step 428 and display the notes in the notepad application. In case that user 402 is offline when the notification from the platform is sent, the shared note will be updated next time when the user starts a new eReading web session.

Later the user 401 may update his notes in step 430. The updated notes may be shared with other users, for example, the notes that user 402 has requested and shared previously. Once the updated notes get uploaded to the platform, the platform 102 is configured to synchronize the notes with all the sharing users in step 432. Therefore, content of the updated notes from user 401 propagates to all the sharing users including user 402.

As an example, assume that two students Alice and Bob both register to a class and read textbook "Biology101". Bob requests to share notes that Alice has taken for the textbook and then log off the digital education platform. The digital education platform takes Alice's notes for Biology101 and inserts them into Bob's notes associated with Biology101. Next time Bob start a new web session to read Biology101, the shared notes from Alice are already interleaved with Bob's notes. Alice later may edit the already shared notes of Biology101. Such editing does not result in new notes being added to the already published notes, instead the content from within each of the updated shared note windows is automatically synchronized with the shared users, including Bob.

As described above, the platform can automatically import content, such as text, images, multimedia files, and links, from emails received at an email account of the user registered at the platform. The email is processed to extract email header and/or indexing keywords to match the email to one or more documents the user is authorized to access. The embedded content of the email can then be automatically extracted and inserted to notes associated with the matched documents for the user. In one embodiment, the service provider of the digital education platform provides a registered user of the platform a default email address, which is operated as a communication channel for automatically importing content directly into a user's notes associated with multilayered documents. The digital education platform processes a received email at the default email address by extracting the embedded content, analyzing the content, determining the properties of the content, and formatting the content into one or more note windows for distribution. The email received at the default email address can be from any registered users or group of users of the digital education platform. Thus, a registered user can share his or her notes via email with other registered users; notes received in emails can be extracted and inserted into pre-defined locations within targeted multilayered documents.

Figure 5:
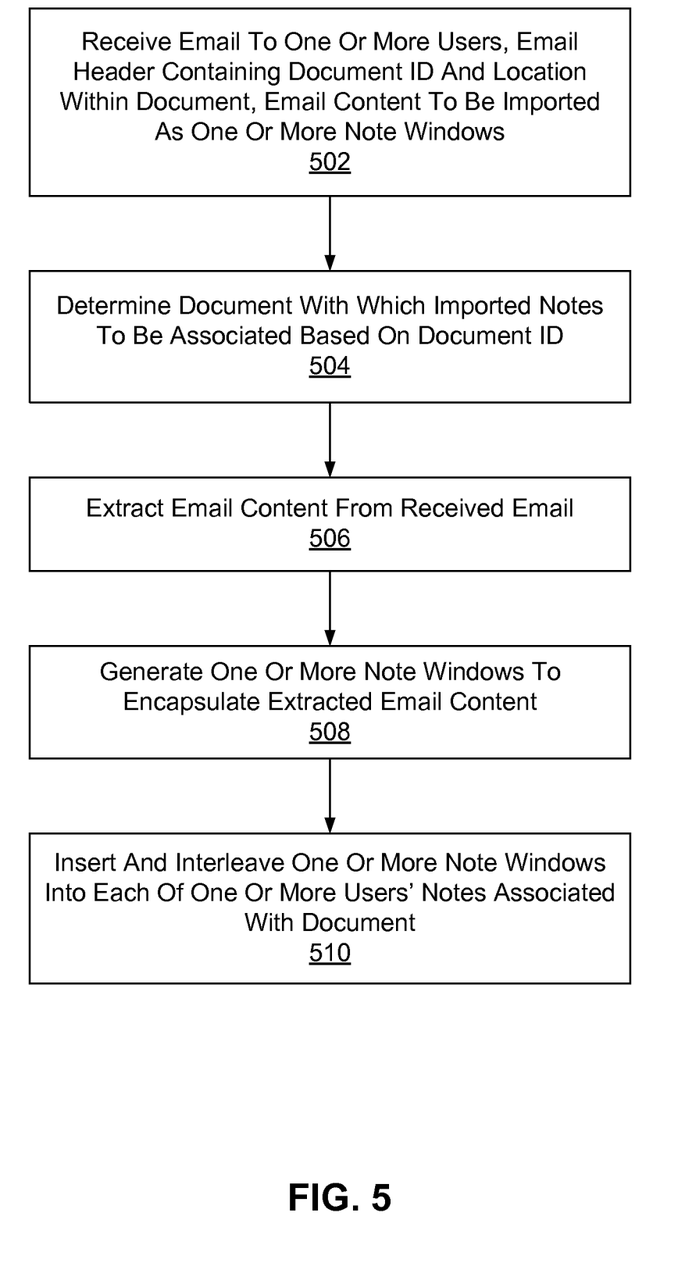
FIG. 5 is a flowchart illustrating a method for importing notes associated with a document from email according to one embodiment.

FIG. 5 is a flowchart illustrating a method for importing notes associated with a document via email according to one embodiment. During the process, the digital education platform first receives an email to one or more users registered at the platform in step 502. In one embodiment, the email header contains information about an identifier of a document and a location within the document. The email content is to be imported as one or more additional note windows into the user's notes document already associated by the document identifier. Based on the document identifier, the platform next determines in step 504 the actual document with which the imported notes are to be associated with. The platform then extracts the email content from the received email in step 506, and generates one or more note windows to encapsulate the extracted email content in step 508. Subsequently, the platform inserts and interleaves these additional notes windows into existing notes associated with the identified document for each of the one or more users, linking these additional notes to their specified location within the identified document based on extracted information in the email header in step 510.

In one embodiment, the digital publishing service provider, as a superuser of the digital education platform, can create pseudo notes that contain merchandising, advertising, or service related content activities. Pseudo notes can then be defined as individual note windows that can be added to users existing notes documents. The digital platform can then publish and distribute such pseudo notes to targeted users. For instance, a user who is accessing a multilayered digital textbook may get one or more such pseudo note windows directly interleaved with existing notes windows within the user's notepad application. Being seamlessly integrated into the existing notes of the user and rendered within the note panel alongside the HTML5 document pages, the pseudo notes provide a mechanism to monetize or advertise platform-specific services to targeted users, with the goal of increasing user engagement with the offered content and services.

Based on the business rules and licensing rights that govern the access of the shared layers of content, the digital education platform enables a variety of services that naturally integrate with the multilayered content document and the educational social network, such as asynchronous access mode and time-based sharing mode. As described above, a teacher can create master notes for a digital textbook through the notepad application and distribute it in the educational social network using the asynchronous or time-based access mode. Similarly, the asynchronous access mode is applicable for students to share their personal notes or other user-generated content within the educational social networks. This approach of creating and sharing a dynamic content layer is suitable for self-publishing within an existing multilayered document service.

In one embodiment, user-generated notes associated with multiple documents can be aggregated into a single set of notes to enable users to more easily review these notes. Similarly, multiple notes sets associated with the same document but created by different users can be aggregated into a single set. The sets of notes aggregated into an aggregated notes document include the notes from the plurality of sets of notes, wherein each note in the aggregated set maintains its link to a location in a document that was defined when the note was created. Notes can also be filtered based on attributes of the notes, such as time of creation, keywords, licensing rights, and social sharing attributes. The filtered notes may be aggregated into an aggregated notes document and viewed in a browser tab adjacent to one of the associated documents, or as a standalone document. Aggregated notes thus created or filtered from multiple note sets that are associated with multiple documents or from multiple users may be shared among users or user groups. In one embodiment, each note or set of notes in the aggregated notes can maintain its own access rights. The digital education platform enforces the access to the aggregated notes based on the requesting user's access right to each note or set of the notes that have been aggregated. Details of the notes aggregation and reduction are described in more detail in U.S. application Ser. Nos. 13/693,036, which is incorporated herein by reference in its entirety.

Additional Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for sharing notes associated with a document on a computer system, the method comprising:
    creating, by a first user, notes associated with a location within the document by linking the first user's notes to a portion of a table to contents of the document that reference the location within document, wherein the notes are associated with the document and stored on the system;
    receiving, at the system, a request from a second user to share the notes created by the first user, the second user's existing notes associated with the same document stored on the system;
    designating access rights to the second user to share the notes created by the first user, the access rights defined by the first user when creating the notes, the access rights specifying a time constraint on access to the first user's notes by the second user and permission for one or more access types given to the second user for accessing the first user's notes;
    inserting, by the system, the first user's notes into the second user's existing notes associated with the document in accordance with the access rights designated to the second user, wherein inserting includes
        accessing the table of contents for the document,
        identifying page locations within an instance of the document provided to the second user and referenced by the portion of the table of contents linked to the first user's notes, the instance of the document provided to the second user also comprising the second user's notes linked to portions of the same table of contents, and
        enabling display of the first user's notes at the identified page locations, within the instance of the document provided to the second user, that are referenced by the portion of the table of contents linked to the first user's notes; and notifying the second user of the availability of the shared notes, thereby allowing the second user to retrieve the shared notes.

2. The method of claim 1, wherein inserting the first user's notes into the second user's existing notes comprises inserting a reference or a pointer, within the document, to the first user's notes in the second user's existing notes.

3. The method of claim 1, wherein notifying the second user of the availability of the shared notes comprises sending a notification message to the second user.

4. The method of claim 1, wherein the time constraint on the access rights designated to the second user define a predetermined period of time during which the second user is provided access to the first user's notes and the access types for which permission can be given to the second user include edit, re-share, review, and comment access types.

5. The method of claim 1, further comprising:
determining whether the second user has an access right to share the notes; and
accepting the request if the second user has the access right to share the notes, otherwise rejecting the request to share the notes.

6. The method of claim 1, further comprising:
updating, by the first user, notes associated with the document on the system, wherein the notes has been shared with the second user;
synchronizing, by the system, the updated notes in the second user's notes associated with the document.

7. A non-transitory computer-readable storage medium storing executable computer program instructions for sharing notes associated with a document, the computer program instructions comprising instructions for:
creating, by a first user, notes associated with a location within the document by linking the first user's notes to a portion of a table to contents of the document that reference the location within document, wherein the notes are associated with the document and stored on the system;
receiving, at the system, a request from a second user to share the notes created by the first user, the second user's existing notes associated with the same document stored on the system;
designating access rights to the second user to share the notes created by the first user, the access rights defined by the first user when creating the notes, the access rights specifying a time constraint on access to the first user's notes by the second user and permission for one or more access types given to the second user for accessing the first user's notes;
inserting, by the system, the first user's notes into the second user's existing notes associated with the document in accordance with the access rights designated to the second user, wherein inserting includes
accessing the table of contents for the document,
identifying page locations within an instance of the document provided to the second user and referenced by the portion of the table of contents linked to the first user's notes, the instance of the document provided to the second user also comprising the second user's notes linked to portions of the same table of contents, and
enabling display of the first user's notes at the identified page locations, within the instance of the document provided to the second user, that are referenced by the portion of the table of contents linked to the first user's notes; and
notifying the second user of the availability of the shared notes, thereby allowing the second user to retrieve the shared notes.

8. The non-transitory computer-readable storage medium of claim 7, wherein inserting the first user's notes into the second user's existing notes comprises inserting a reference or a pointer, within the document, to the first user's notes in the second user's existing notes.

9. The non-transitory computer-readable storage medium of claim 8, wherein notifying the second user of the availability of the shared notes comprises sending a notification message to the second user.

10. The non-transitory computer-readable storage medium of claim 7, wherein the time constraint on the access rights designated to the second user define a predetermined period of time during which the second user is provided access to the first user's notes and the access types for which permission can be given to the second user include edit, re-share, review, and comment access types.

11. The non-transitory computer-readable storage medium of claim 7, wherein the computer program instructions further comprise instructions for:
determining whether the second user has an access right to share the note; and
accepting the request if the second user has the access right to share the note, otherwise rejecting the request to share the note.

12. The non-transitory computer-readable storage medium of claim 7, wherein the computer program instructions further comprise instructions for:
updating, by the first user, a note stored in the first user's notes associated with the document on the system, wherein the note has been shared with the second user;
synchronizing, by the system, the updated note in the second user's notes associated with the document.

13. The method of claim 1, wherein:
the access rights defined by the first user vary as a function of time of access, by the second user, of the first user's notes; and
inserting the first user's notes into the second user's existing notes in accordance with the access rights comprises determining a time of viewing of the first user's notes by the second user and filtering the first user's notes for insertion based on the determined time of viewing and access rights defined by the first user for the determined time of viewing.

14. The method of claim 1, wherein:
the access rights defined by the first user vary as a function of social connectivity of a requesting user; and
inserting the first user's notes into the second user's existing notes in accordance with the access rights comprises determining a social connectivity of the second user and filtering the first user's notes for insertion based on the determined social connectivity of the second user and access rights defined by the first user for the determined social connectivity.

15. The method of claim 1, wherein:
the request from the second user to share the notes created by the first user comprises an indication to view the first user's notes along with the second user's existing notes independent of the document, the second user's existing notes linked to portions of the same table of contents of the document;
inserting the first user's notes into the second user's existing notes associated with the document comprises organizing the first user's notes with respect to the second user's notes based on relative portions of the table of contents to which the first and second user's notes are linked; and enabling display, to the second user, of the first user's notes organized with respect to the second user's existing notes without providing the document.

\* \* \* \* \*